UNITED STATES PATENT OFFICE.

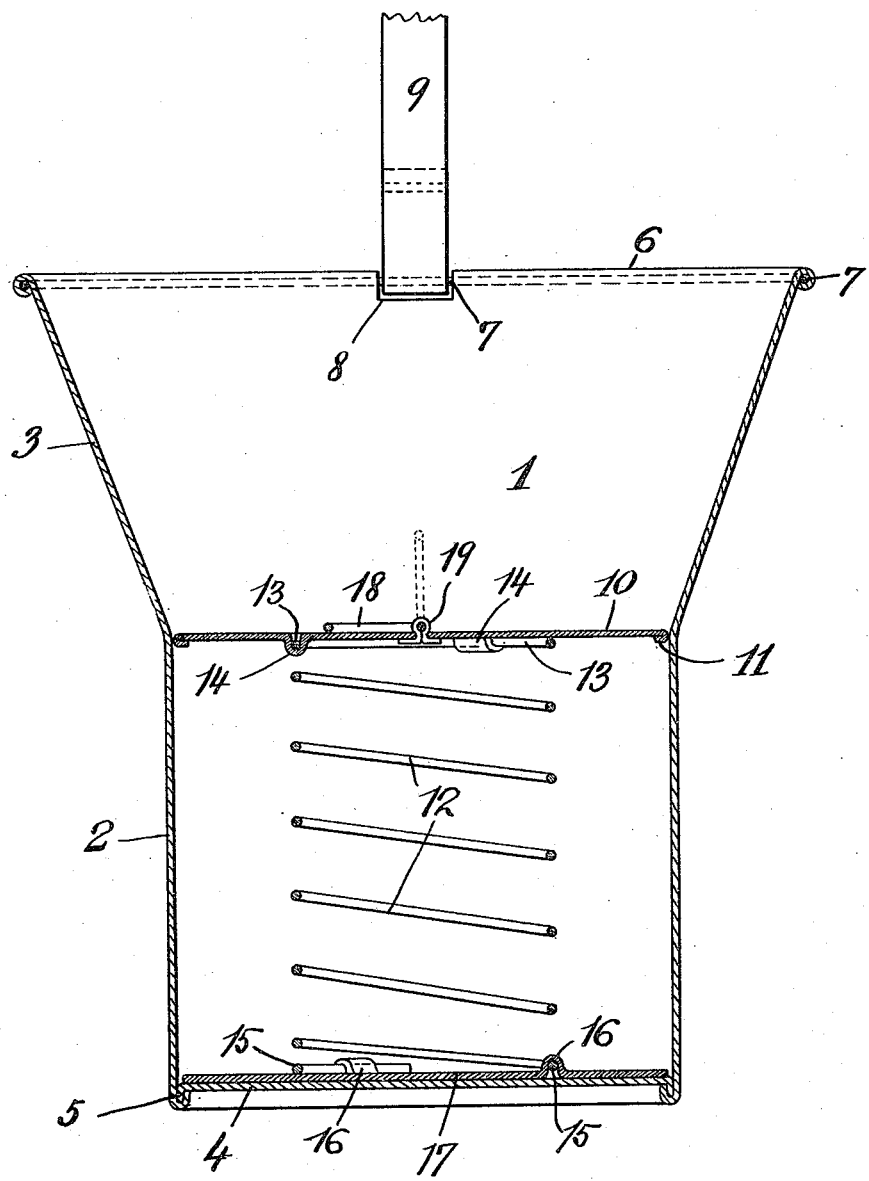

HARRY KLENERT, OF NEW YORK, N. Y.

COMBINATION FEED AND WATER PAIL.

1,145,150.　　　　　Specification of Letters Patent.　　Patented July 6, 1915.

Application filed July 25, 1914. Serial No. 853,023.

*To all whom it may concern:*

Be it known that I, HARRY KLENERT, a citizen of the United States of America, and a resident of the city, county, and State of New York, have invented certain new and useful Improvements in Combination Feed and Water Pails, of which the following is a specification.

This invention relates to improvements in combination feed and water pails and the object of the invention is to provide a sanitary, light and strong receptacle adapted for use as a feed pail and as a water pail.

To this end the invention is embodied in a receptacle made of suitable material such as sheet metal for instance and of suitable shape and dimensions. When the receptacle is to be used as a feed pail there is inserted in it a feed elevating device for maintaining the feed at a constant level for the convenience of the animal and to avoid waste.

The feed elevating device is removably inserted in the pail, so that, when the feed is consumed, the device may be removed and the receptacle used as a pail for drinking water for the animal.

Other objects of the invention are to construct the combination feed and water pail in such a manner that it is sanitary, easily cleaned and with ordinary care will last for a long time and may be produced at a low cost of manufacture.

The invention will be more fully understood by reference to the accompanying drawing which is a central vertical sectional view through a combination feed and water pail embodying my invention.

In the drawing the reference numeral 1 represents a receptacle, preferably made of sheet metal and comprising a cylindrical portion 2 and a flaring upper portion 3. In the drawing the flaring portion is shown as being cylindrical in shape, but it may flare to only one side as illustrated in my Patent Number 1,064,745, of June 17, 1913. The two portions 2 and 3 may be made in one piece as shown, or may be in two pieces suitably joined.

4 is the bottom of the receptacle which may be secured as by a seam 5 or otherwise.

The upper edge 6 of the flaring portion 3 is turned over as shown and reinforced by a wire 7, forming a bead, which is cut away at opposite places as at 8 to permit the insertion of a suitable strap 9 with which to support the receptacle from the animal's neck.

The feed elevating device referred to in the foregoing comprises a movable false bottom 10 adapted to slide within the cylinder 2. The edge of the bottom 10 is turned over to form a bead 11 to facilitate the sliding movement of the bottom within the cylinder.

12 is a suitable spring for elevating the bottom 10. The uppermost coil 13 of the spring is horizontal and secured to the bottom 10 by loops or eyes 14 punched out of said bottom and through which loops the coil 13 passes as shown. Preferably I provide at least three such loops 14. The lowermost coil 15 of the spring is similarly secured by loops 16 to a plate 17 which rests loosely on the bottom 4 of the receptacle.

18 is a ring suitably secured to the false bottom 10 by a staple 19 or otherwise.

It is apparent from this description and the drawing that the entire feed elevating device comprising the plates 10 and 17 and the spring 12 may be lifted out of the receptacle 1.

When it is desired to use the receptacle as a feed pail, the feed elevating device is inserted and the feed poured in. The weight of the feed depresses the spring and moves down the false bottom as is obvious. As the feed is being consumed the spring 12 gradually elevates the false bottom thus keeping the feed at a constant level. After feeding, the feed elevating device is removed and the receptacle used as a pail for water.

Because of the plurality of points at which the spring is secured to the false bottom, the latter is prevented from tilting and sticking in the receptacle, as will be understood. The plate 17 serves to steady the spring and properly center it. It also protects the spring when the elevating device is removed from the pail.

I claim:

In a combination feed and water pail a receptacle having imperforate bottom and sides adapted to contain feed or water, a feed elevating device removably inserted in said receptacle, and comprising an upper false bottom, a lower plate resting on the bottom of said receptacle, a spring secured to said plate and false bottom for elevating the latter and means whereby the feed elevating device may be removed from the said receptacle.

Signed at New York, N. Y. this 24 day of July 1914.

HARRY KLENERT.

Witnesses:
 IVAN KONIGSBERG,
 K. G. LEARD.

Copies of this patent may be obtained for five cents each, by addressing the "Commissioner of Patents, Washington, D. C."